US012652704B2

(12) United States Patent
Hong

(10) Patent No.: US 12,652,704 B2
(45) Date of Patent: Jun. 9, 2026

(54) CAPABILITY REPORTING METHOD AND DEVICE AND INFORMATION CONFIGURATION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 238 days.

(21) Appl. No.: 18/552,772

(22) PCT Filed: Mar. 30, 2021

(86) PCT No.: PCT/CN2021/084135
§ 371 (c)(1),
(2) Date: Sep. 27, 2023

(87) PCT Pub. No.: WO2022/204998
PCT Pub. Date: Oct. 6, 2022

(65) Prior Publication Data
US 2024/0163930 A1      May 16, 2024

(51) Int. Cl.
H04W 8/22        (2009.01)
H02J 50/20       (2016.01)
H02J 50/40       (2016.01)
H02J 50/80       (2016.01)
H04W 8/24        (2009.01)
H04W 74/0833     (2024.01)

(52) U.S. Cl.
CPC ......... *H04W 74/0833* (2013.01); *H02J 50/20* (2016.02); *H02J 50/402* (2020.01); *H02J 50/80* (2016.02); *H04W 8/24* (2013.01)

(58) Field of Classification Search
None
See application file for complete search history.

(56) References Cited

U.S. PATENT DOCUMENTS

2019/0363843 A1* 11/2019 Gordaychik .......... H04W 28/16

FOREIGN PATENT DOCUMENTS

| CN | 101931250 A | 12/2010 |
|----|-------------|---------|
| CN | 103167588 A | 6/2013 |
| CN | 107040026 A | 8/2017 |
| CN | 111971873 A | 11/2020 |
| JP | 2014-128064 A | 7/2014 |

OTHER PUBLICATIONS

International Search Report Issued Dec. 31, 2021, in PCT/CN2021/084135, filed on Mar. 30, 2021, with English Translation, 4 pages.

(Continued)

*Primary Examiner* — Gary Lafontant
(74) *Attorney, Agent, or Firm* — Oblon, McClelland, Maier & Neustadt, L.L.P.

(57) ABSTRACT
The present disclosure provides a capability reporting method and device, an information configuration method and device, and a storage medium. The capability reporting method can include reporting target capability information to a base station, the target capability information being information related to the wireless charging capability of a terminal.

16 Claims, 7 Drawing Sheets

Reporting target capability information to the base station, where the target capability information is related to the wireless charging capability of the terminal.

101

(56)      References Cited

OTHER PUBLICATIONS

Fang Ming, Yao Zhongyang, Yang Chun. "Npl Wireless Network Planning and Optimization." China Railway Publishing House Co., Ltd. Beijing, Mar. 2020.
Chinese Office Action dated Jan. 29, 2026, Issued in Chinese Patent Application No. 202180000773.8 (with English translation; Documents 18 and 26 being cited therein).

* cited by examiner

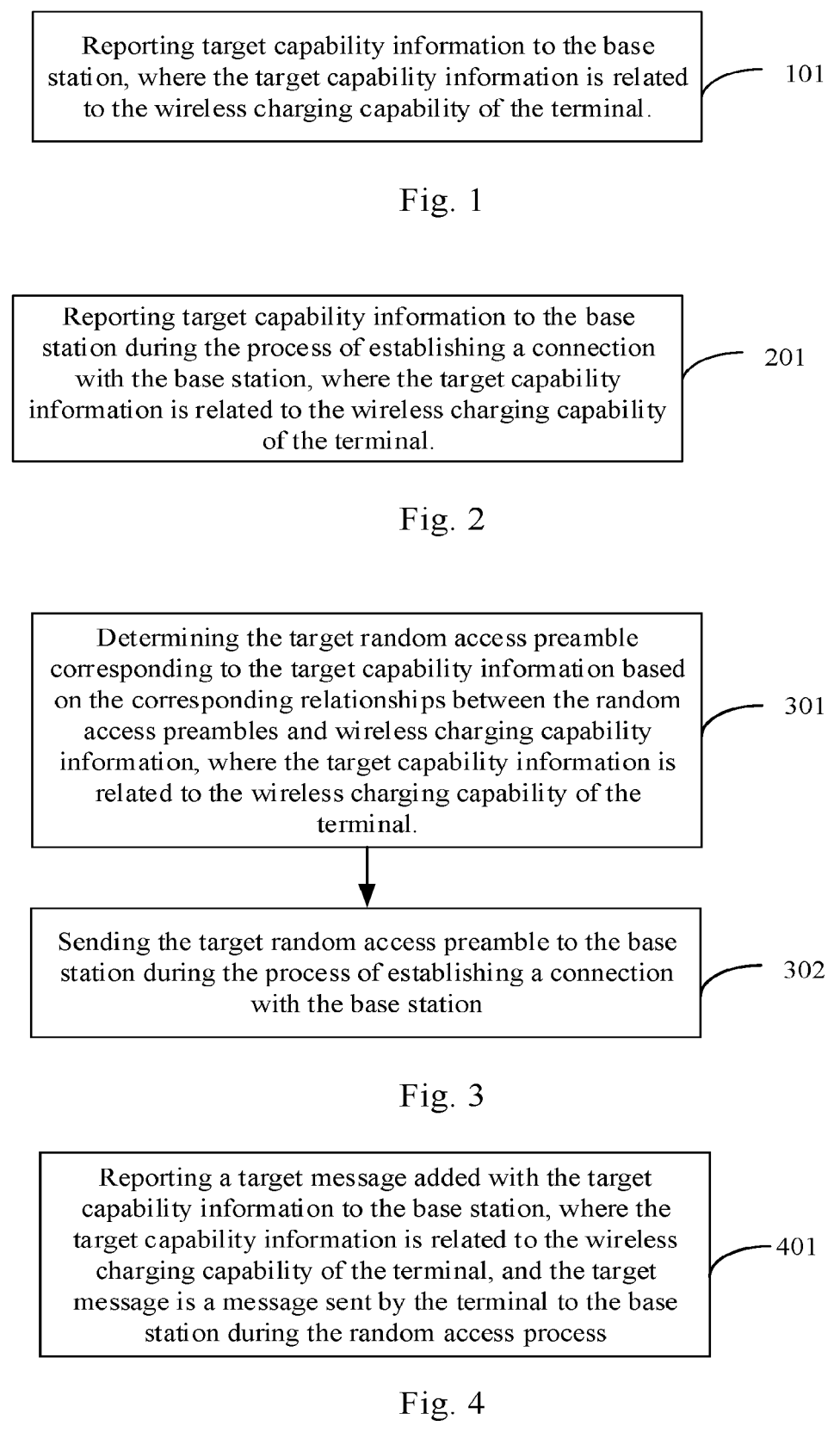

Reporting target capability information to the base station, where the target capability information is related to the wireless charging capability of the terminal.          101

Fig. 1

Reporting target capability information to the base station during the process of establishing a connection with the base station, where the target capability information is related to the wireless charging capability of the terminal.          201

Fig. 2

Determining the target random access preamble corresponding to the target capability information based on the corresponding relationships between the random access preambles and wireless charging capability information, where the target capability information is related to the wireless charging capability of the terminal.          301

Sending the target random access preamble to the base station during the process of establishing a connection with the base station          302

Fig. 3

Reporting a target message added with the target capability information to the base station, where the target capability information is related to the wireless charging capability of the terminal, and the target message is a message sent by the terminal to the base station during the random access process          401

Fig. 4

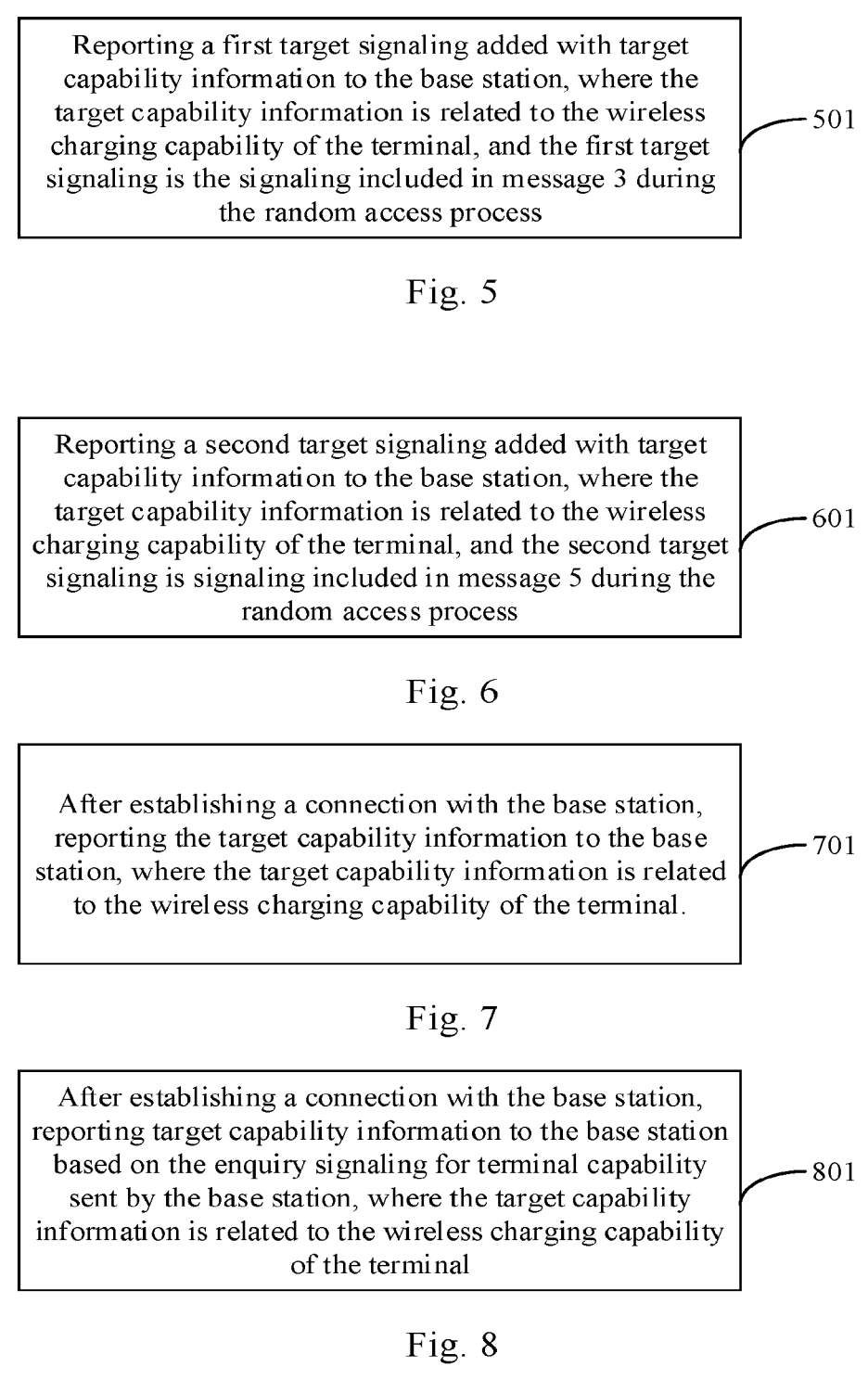

Reporting a first target signaling added with target capability information to the base station, where the target capability information is related to the wireless charging capability of the terminal, and the first target signaling is the signaling included in message 3 during the random access process ⟋ 501

Fig. 5

Reporting a second target signaling added with target capability information to the base station, where the target capability information is related to the wireless charging capability of the terminal, and the second target signaling is signaling included in message 5 during the random access process ⟋ 601

Fig. 6

After establishing a connection with the base station, reporting the target capability information to the base station, where the target capability information is related to the wireless charging capability of the terminal. ⟋ 701

Fig. 7

After establishing a connection with the base station, reporting target capability information to the base station based on the enquiry signaling for terminal capability sent by the base station, where the target capability information is related to the wireless charging capability of the terminal ⟋ 801

Fig. 8

Configuring target configuration information for wireless charging of the terminal based on the target capability information reported by the terminal, where the target capability information is related to the wireless charging capability of the terminal. ⌐901

Fig. 9

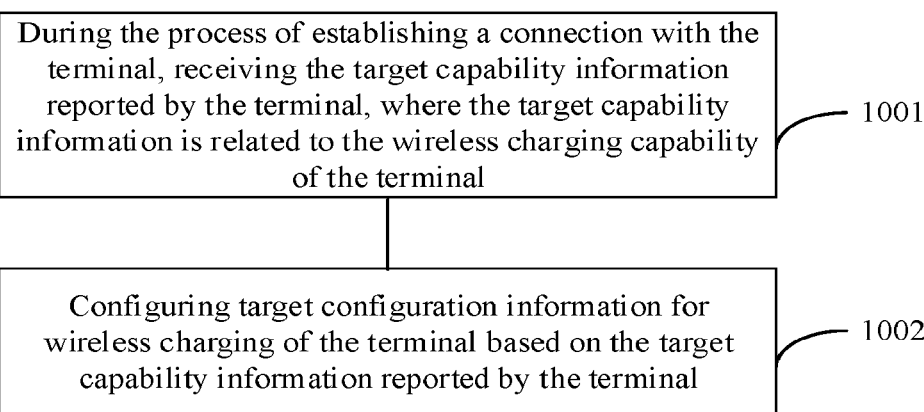

During the process of establishing a connection with the terminal, receiving the target capability information reported by the terminal, where the target capability information is related to the wireless charging capability of the terminal ⌐1001

Configuring target configuration information for wireless charging of the terminal based on the target capability information reported by the terminal ⌐1002

Fig. 10

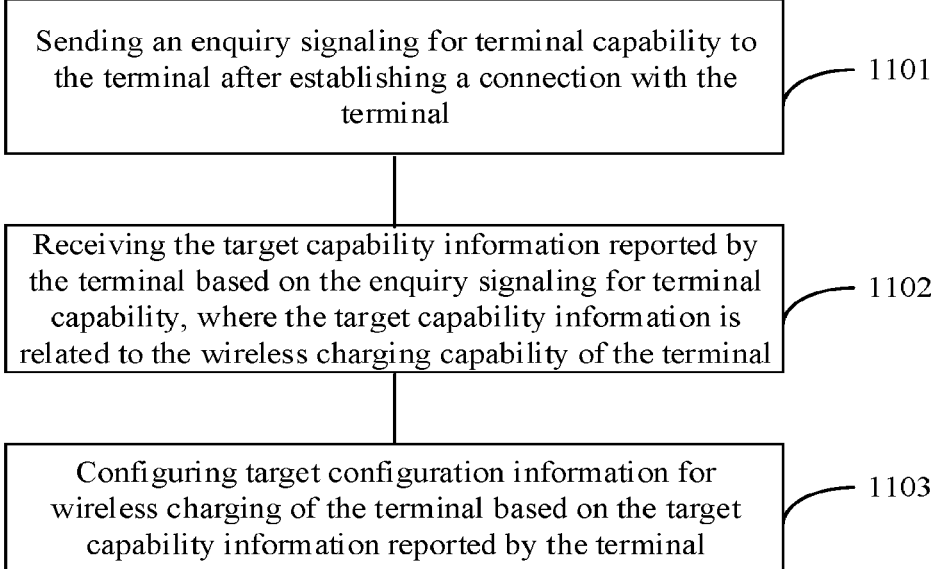

Sending an enquiry signaling for terminal capability to the terminal after establishing a connection with the terminal ⌐1101

Receiving the target capability information reported by the terminal based on the enquiry signaling for terminal capability, where the target capability information is related to the wireless charging capability of the terminal ⌐1102

Configuring target configuration information for wireless charging of the terminal based on the target capability information reported by the terminal ⌐1103

Fig. 11

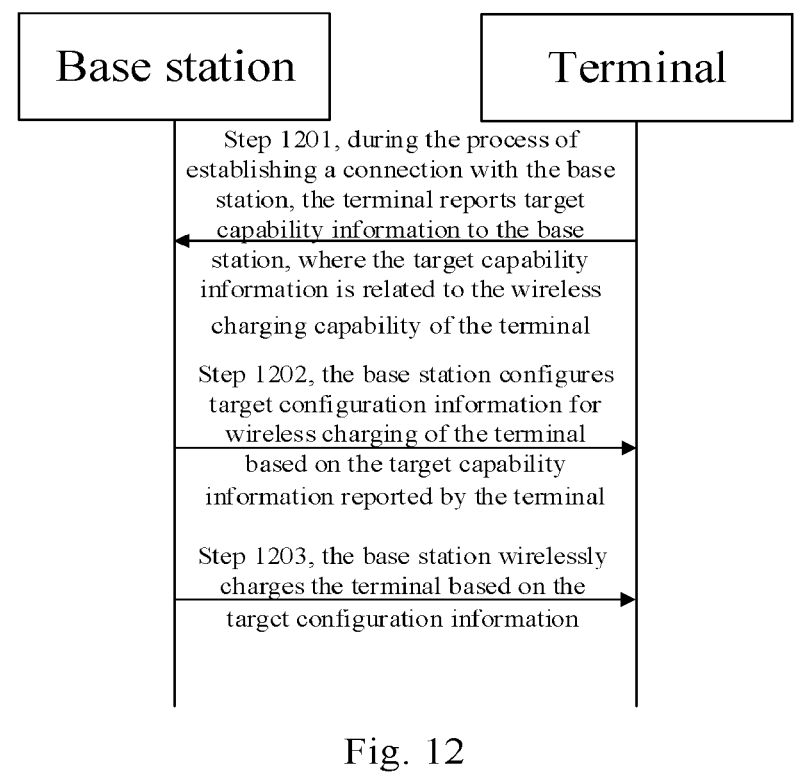

| Base station | | Terminal |
|---|---|---|

Step 1201, during the process of establishing a connection with the base station, the terminal reports target capability information to the base station, where the target capability information is related to the wireless charging capability of the terminal Step 1202, the base station configures target configuration information for wireless charging of the terminal based on the target capability information reported by the terminal Step 1203, the base station wirelessly charges the terminal based on the target configuration information

Fig. 12

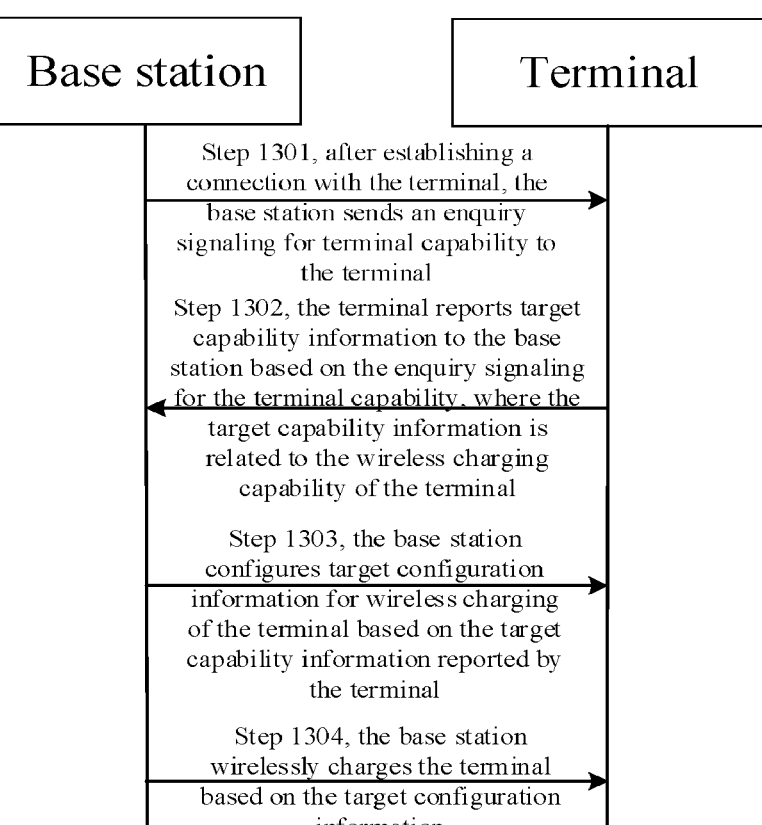

Step 1301, after establishing a connection with the terminal, the base station sends an enquiry signaling for terminal capability to the terminal Step 1302, the terminal reports target capability information to the base station based on the enquiry signaling for the terminal capability, where the target capability information is related to the wireless charging capability of the terminal Step 1303, the base station configures target configuration information for wireless charging of the terminal based on the target capability information reported by the terminal Step 1304, the base station wirelessly charges the terminal based on the target configuration information

Fig. 13

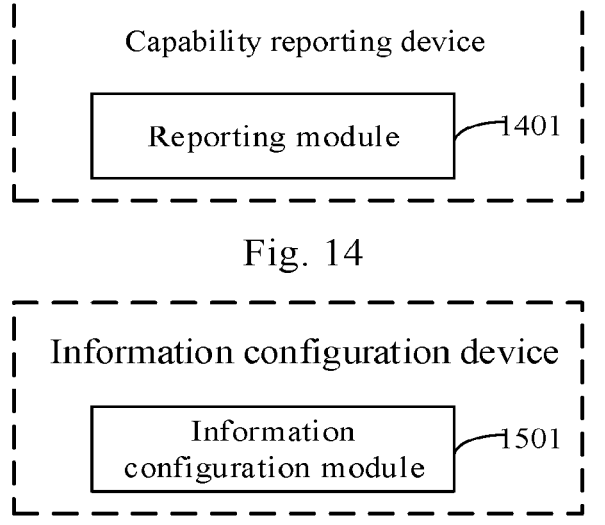

Capability reporting device

Reporting module — 1401

Fig. 14

Information configuration device

Information configuration module — 1501

Fig. 15

CAPABILITY REPORTING METHOD AND DEVICE AND INFORMATION CONFIGURATION METHOD AND DEVICE

CROSS-REFERENCE OF RELATED APPLICATION

The present application is a National Stage of International Application No. PCT/CN2021/084135, filed on Mar. 30, 2021, the contents of all of which are incorporated by reference herein in their entireties for all purposes.

BACKGROUND

Technical Field

This disclosure relates to the field of communication, in particular to capability reporting method, information configuration method, and device.

Description of the Related Art

At present, wireless charging technology is mainly classified into three categories: electromagnetic induction technology, electromagnetic resonance technology, and wireless radio frequency technology.

The wireless radio frequency technology includes air charging technology, which can use space electric field as a medium for energy transmission. For example, energy can be transmitted to the terminal through a large number of antennas in the form of extremely narrow millimeter wave beams, which is then received by the terminal through miniature beacon antenna, thus achieving long-distance wireless charging.

With the development of cellular mobile communication technology, especially millimeter wave communication technology, there will be more and more antennas that can be equipped on the base station. For example, Massive MIMO (Massive Multiple Input Multiple Output) is one of the key technologies of 5G (5th generation mobile communication networks).

SUMMARY

The embodiments of the present disclosure provides method and device for capability reporting and information configuration.

According to a first aspect of the embodiments of the present disclosure, there is provided a capability reporting method, applied to a terminal, including reporting target capability information to a base station, where the target capability information is related to wireless charging capability of the terminal.

According to a second aspect of the embodiments of the present disclosure, there is provided an information configuration method, applied to a base station, including configuring target configuration information for wireless charging of a terminal based on target capability information reported by the terminal, where the target capability information is related to wireless charging capability of the terminal.

According to a third aspect of the embodiments of the present disclosure, there is provided a capability reporting device, applied to a terminal, including: a reporting module configured to report target capability information to a base station, where the target capability information is related to wireless charging capability of the terminal.

According to a fourth aspect of the embodiments of the present disclosure, there is provided an information configuration device, applied to a base station, including: an information configuration module configured to configure target configuration information for wireless charging of a terminal based on target capability information reported by the terminal, where the target capability information is related to wireless charging capability of the terminal.

According to a fifth aspect of the embodiments of the present disclosure, there is provided a capability reporting device, including a processor and a memory for storing non-transitory processor-executable instructions. The processor is configured to perform the capability reporting method according to any one of the first aspect.

According to a sixth aspect of the embodiments of the present disclosure, there is provided an information configuration device, including a processor and a memory for storing non-transitory processor executable instructions. The processor is configured to perform the information configuration method according to any one of the second aspect.

It should be understood that the general description above and the detailed description in the following text are only illustrative and explanatory, and do not limit this disclosure.

BRIEF DESCRIPTION OF THE DRAWINGS

The accompanying drawings here are incorporated into the specification and form a part of this specification, showing embodiments in accordance with the present disclosure and used together with the specification to explain the principles of the present disclosure.

FIG. 1 is a schematic flowchart illustrating a capability reporting method according to an exemplary embodiment.

FIG. 2 is a schematic flowchart illustrating another capability reporting method according to an exemplary embodiment.

FIG. 3 is a schematic flowchart illustrating another capability reporting method according to an exemplary embodiment.

FIG. 4 is a schematic flowchart illustrating another capability reporting method according to an exemplary embodiment.

FIG. 5 is a schematic flowchart illustrating another capability reporting method according to an exemplary embodiment.

FIG. 6 is a schematic flowchart illustrating another capability reporting method according to an exemplary embodiment.

FIG. 7 is a schematic flowchart illustrating another capability reporting method according to an exemplary embodiment.

FIG. 8 is a schematic flowchart illustrating another capability reporting method according to an exemplary embodiment.

FIG. 9 is a schematic flowchart illustrating an information configuration method according to an exemplary embodiment.

FIG. 10 is a schematic flowchart illustrating another information configuration method according to an exemplary embodiment.

FIG. 11 is a schematic flowchart illustrating another information configuration method according to an exemplary embodiment.

FIG. 12 is a schematic flowchart illustrating a wireless charging method according to an exemplary embodiment.

FIG. 13 is a schematic flowchart illustrating another wireless charging method according to an exemplary embodiment.

FIG. 14 is a block diagram illustrating a capability reporting device according to an exemplary embodiment.

FIG. 15 is a block diagram illustrating an information configuration device according to an exemplary embodiment.

DETAILED DESCRIPTION OF THE PREFERRED EMBODIMENTS

Figure 16:
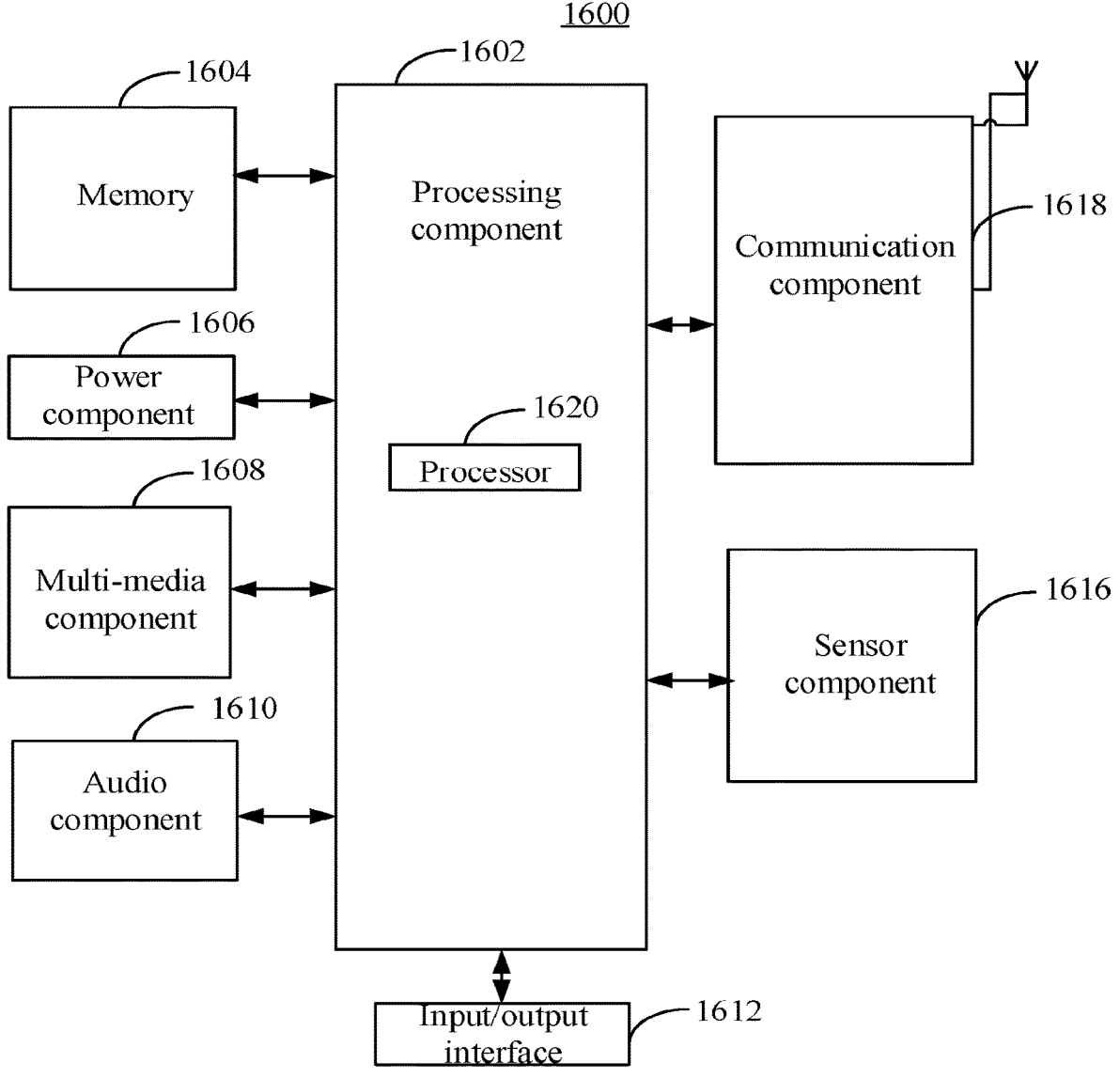
FIG. 16 is a structural schematic diagram illustrating a capability reporting device according to an exemplary embodiment of the present disclosure.

Here, a detailed explanation will be given of exemplary embodiments, which are illustrated in the accompanying drawings. When the following description refers to the accompanying drawings, unless otherwise indicated, the same reference number in different drawings represents the same or similar element. The implementations described in the following exemplary embodiments do not represent all implementations consistent with the present disclosure. On the contrary, they are only examples of devices and methods that are consistent with some aspects of the present disclosure as detailed in the attached claims.

The terms used in this disclosure are solely for the purpose of describing specific embodiments and are not intended to limit this disclosure. The singular forms of "one", "said", and "the" used in this disclosure and the accompanying claims are also intended to include the majority form, unless the context clearly indicates other meanings. It should also be understood that the term "and/or" used here refers to and includes any or all possible combinations of one or more related listed items.

It should be understood that although the terms first, second, third, etc. may be used to describe various information in this disclosure, such information should not be limited to these terms. These terms are only used to distinguish the same type of information from each other. For example, without departing from the scope of this disclosure, the first information can also be referred to as the second information, and similarly, the second information can also be referred to as the first information. Depending on the context, the word "if" used here can be interpreted as "at" or "when" or "in response to determining that . . . ".

At present, wireless charging of a terminal through a cellular network is still not possible, mainly due to the lack of information related to the wireless charging capability of the terminal on the network side. To address the above issue, this disclosure provides a capability reporting scheme.

According to an embodiment of the present disclosure, it provides a capability reporting method, as shown in FIG. 1. FIG. 1 is a flowchart illustrating a capability reporting method according to an embodiment, which can be applied to a terminal. The method can include the following steps.

In step 101, reporting target capability information to the base station, where the target capability information is related to the wireless charging capability of the terminal.

In the above embodiment, the terminal can report information related to the wireless charging capability of the terminal, i.e., target capability information, to the base station, achieving the purpose of reporting information related to wireless charging capability to the network side through the cellular network. The network side can then configure more accurate wireless charging configuration for the terminal based on the target capability information, thereby achieving high availability.

In one embodiment, the target capability information can include target indication information, which is used by the terminal to report to the network side whether the terminal has wireless charging capability. In the embodiment of the present disclosure, the target indication information indicates that the terminal has wireless charging capability, or the target indication information indicates that the terminal does not have wireless charging capability.

In the above embodiment, the terminal can inform the network side whether the terminal has wireless charging capability by reporting target indication information, so that the network side can then determine whether wireless charging is needed for the terminal, thereby achieving high availability.

In another embodiment, in the case of the target indication information included in the target capability information indicating that the terminal has wireless charging capability, the target capability information may further include, but is not limited to, at least one of the following: power information of the wireless charging supported by the terminal, antenna number information of the wireless charging supported by the terminal, and frequency information of the wireless charging supported by the terminal.

The power information can be measured in watts, and the frequency information can refer to the frequency resource information corresponding to the terminal's operation when the network side wirelessly charges the terminal.

In the above embodiment, in the case of the target indication information reported by the terminal indicating that the terminal has wireless charging capability, the terminal can further report at least one of power information, antenna number information, and frequency information of the wireless charging supported by itself to the network side through the target capability information, so that the network side can then configure a more accurate wireless charging configuration for the terminal based on the target capability information, thereby achieving high availability.

In some embodiments, referring to FIG. 2, FIG. 2 is a flowchart illustrating a capability reporting method according to an embodiment, which can be applied to a terminal. The method can include the following steps.

In step 201, reporting target capability information to the base station during the process of establishing a connection with the base station, where the target capability information is related to the wireless charging capability of the terminal.

In the above embodiment, the terminal can report target capability information during the process of establishing a connection with the base station, thereby reporting information related to the wireless charging capability to the network side through the cellular network, which has high availability.

In some embodiments, referring to FIG. 3, FIG. 3 is a flowchart illustrating a capability reporting method according to an embodiment, which can be applied to a terminal. The method can include the following steps.

In step 301, determining the target random access preamble corresponding to the target capability information based on the corresponding relationships between the random access preambles and wireless charging capability information, where the target capability information is related to the wireless charging capability of the terminal.

In the embodiment of the present disclosure, different random access preambles can correspond to different wireless charging capability information. For example, random access preamble 1 corresponds to that the terminal does not have wireless charging capability, while random access preamble 2 corresponds to that the terminal has wireless charging capability, and the power information of the supported wireless charging is m1 watts, and the frequency information of the supported wireless charging is n1; random access preamble 3 corresponds to that the terminal has wireless charging capability, and the power information of the supported wireless charging is m2 watts, the number of antennas of the supported wireless charging is 1, and the frequency information of the supported wireless charging is n2, where m1 and m2 are positive numbers.

The terminal can determine the target random access preamble corresponding to the target capability information of the terminal based on the above corresponding relationships.

In step 302, sending the target random access preamble to the base station during the process of establishing a connection with the base station.

In the above embodiment, the target random access preamble can inform the network side that the terminal has initiated random access currently, and can also inform the network side of the target capability information of the terminal, thereby reporting information related to the wireless charging capability to the network side through the cellular network during the process of establishing a connection between the terminal and the base station.

In one embodiment, the above-mentioned corresponding relationships between the random access preamble and the wireless charging capability information can be pre agreed in the protocol, and the terminal can directly determine the corresponding relationships according to the protocol agreement.

In another embodiment, the above-mentioned corresponding relationships between the random access preamble and the wireless charging capability information can be configured by the network side, and the terminal determines the corresponding relationships based on the configuration of the base station.

In some embodiments, referring to FIG. 4, FIG. 4 is a flowchart illustrating a capability reporting method according to an embodiment, which can be applied to a terminal. The method can include the following steps.

In step 401, reporting a target message added with the target capability information to the base station, where the target capability information is related to the wireless charging capability of the terminal, and the target message is a message sent by the terminal to the base station during the random access process.

In the embodiment of the present disclosure, the target message includes but is not limited to message 3 or message 5 sent by the terminal to the base station during the random access process.

In the above embodiment, the terminal can report target capability information to the network side through target message during the process of establishing a connection with the base station, thereby achieving high availability.

In some embodiments, referring to FIG. 5, FIG. 5 is a flowchart illustrating a capability reporting method according to one embodiment, which can be applied to a terminal. The method can include the following steps.

In step 501, reporting a first target signaling added with target capability information to the base station, where the target capability information is related to the wireless charging capability of the terminal, and the first target signaling is the signaling included in message 3 during the random access process.

In the embodiment of the present disclosure, the first target signaling includes but is not limited to at least one of the following: RRCSetupRequest signaling and RRCReestablishmentRequest signaling.

In the above embodiment, reporting information related to wireless charging capability to the network side through the cellular network during the process of establishing a connection between the terminal and the base station is achieved.

In some embodiments, referring to FIG. 6, FIG. 6 is a flowchart illustrating a capability reporting method according to one embodiment, which can be applied to a terminal. The method can include the following steps.

In step 601, reporting a second target signaling added with target capability information to the base station, where the target capability information is related to the wireless charging capability of the terminal, and the second target signaling is signaling included in message 5 during the random access process.

In the embodiment of the present disclosure, the second target signaling includes but is not limited to at least one of the following: RRCSetupComplete signaling, and RRCReestablishmentComplete signaling.

In the above embodiment, reporting information related to wireless charging capability to the network side through the cellular network during the process of establishing a connection between the terminal and the base station is achieved.

In some embodiments, referring to FIG. 7, FIG. 7 is a flowchart illustrating a capability reporting method according to one embodiment, which can be applied to a terminal. The method can include the following steps.

In step 701, after establishing a connection with the base station, reporting the target capability information to the base station, where the target capability information is related to the wireless charging capability of the terminal.

In the above embodiment, reporting information related to wireless charging capability to the network side through the cellular network after establishing a connection between the terminal and the network side is achieved.

In some embodiments, referring to FIG. 8, FIG. 8 is a flowchart illustrating a capability reporting method according to one embodiment, which can be applied to a terminal. The method can include the following steps.

In step 801, after establishing a connection with the base station, reporting target capability information to the base station based on the enquiry signaling for terminal capability sent by the base station, where the target capability information is related to the wireless charging capability of the terminal.

In the embodiment of the present disclosure, after the terminal establishing a connection with the base station, the base station can send a UECapabilityEnquiry signaling to the terminal. After receiving the enquiry signaling for terminal capability, the terminal reports the target capability information.

In the above embodiment, reporting information related to wireless charging capability to the network side through the cellular network after establishing a connection between the terminal and the network side is achieved.

In one embodiment, the base station sends UECapabilityEnquiry signaling to the terminal, and the UECapabilityEnquiry signaling includes enquiry information enquiring about the wireless charging capability of the terminal. After receiving the UECapabilityEnquiry signaling containing the enquiry information, the terminal determines that the network side enquires about the wireless charging capability of the terminal, and further reports the target capability information to the base station.

In another embodiment, the base station sends UECapabilityEnquiry signaling to the terminal, but the UECapabilityEnquiry signaling does not include enquiry information enquiring about the wireless charging capability of the terminal. For example, the UECapabilityEnquiry signaling sent by the base station to the terminal is consistent with the signaling content of the UECapabilityEnquiry signaling in the related art, that is, there is no need to add enquiry information enquiring about the wireless charging capability of the terminal in the UECapabilityEnquiry signaling. After receiving the UECapabilityEnquiry signaling, the terminal also determines that the network side enquires about the wireless charging capability of the terminal, and further reports the target capability information to the base station.

In another embodiment, the terminal adds the target capability information to the UECapabilityInformation signaling, and further reports the UECapabilityInformation signaling added with the target capability information to the base station.

Below, the information configuration scheme provided by this disclosure from the base station side will be introduced.

Referring to FIG. 9, FIG. 9 is a flowchart illustrating an information configuration method according to an embodiment, which can be applied to a base station. The method can include the following steps.

In step 901, configuring target configuration information for wireless charging of the terminal based on the target capability information reported by the terminal, where the target capability information is related to the wireless charging capability of the terminal.

In the above embodiment, the base station can configure target configuration information for wireless charging of the terminal based on the target capability information related to the wireless charging capability of the terminal reported by the terminal, thereby providing the terminal with more accurate wireless charging configuration, which has high availability.

In some embodiments, the target capability information includes target indication information, which indicates that the terminal has wireless charging capability, or indicates that the terminal does not have wireless charging capability.

In some embodiments, in the case of the target indication information indicating that the terminal has wireless charging capability, the target capability information may also include, but is not limited to, at least one of the following: power information of the wireless charging supported by the terminal, antenna number information of the wireless charging supported by the terminal, and frequency information of the wireless charging supported by the terminal.

In some embodiments, referring to FIG. 10, FIG. 10 is a flowchart illustrating an information configuration method according to one embodiment, which can be applied to a base station. The method can include the following steps.

In step 1001, during the process of establishing a connection with the terminal, receiving the target capability information reported by the terminal, where the target capability information is related to the wireless charging capability of the terminal.

In step 1002, configuring target configuration information for wireless charging of the terminal based on the target capability information reported by the terminal.

In the embodiment of the present disclosure, the base station can receive the target capability information reported by the terminal during the process of establishing a connection with the terminal, thereby providing a more accurate wireless charging configuration for the terminal based on the target capability information, which is easy to implement and has high availability.

In one embodiment, the terminal sends a target random access preamble to the base station during the random access process. The base station can determine the target capability information corresponding to the target random access preamble based on the corresponding relationships between the random access preambles and wireless charging capability information. The above corresponding relationships can be agreed upon in the protocol or configured by the base station.

In another embodiment, the terminal can report target capability information to the base station through the first target signaling included in message 3 during the random access process. The first target signaling includes but is not limited to RRCSetupRequest signaling and RRCReestablishmentRequest signaling.

In another embodiment, the terminal can report target capability information to the base station through the second target signaling included in message 5 during the random access process. The second target signaling includes but is not limited to RRCSetupComplete signaling and RRCReestablishmentComplete signaling.

In some embodiments, referring to FIG. 11, FIG. 11 is a flowchart illustrating an information configuration method according to an embodiment, which can be applied to a base station. The method can include the following steps.

In step 1101, sending an enquiry signaling for terminal capability to the terminal after establishing a connection with the terminal.

In step 1102, receiving the target capability information reported by the terminal based on the enquiry signaling for terminal capability, where the target capability information is related to the wireless charging capability of the terminal.

In step 1103, configuring target configuration information for wireless charging of the terminal based on the target capability information reported by the terminal.

In the above embodiment, after establishing a connection with the terminal, the base station can make the terminal report the target capability information by enquiry signaling for terminal capability. Based on the target capability information, the base station configures target configuration information, achieving high availability.

In one embodiment, the enquiry signal for terminal capability includes enquiry information enquiring about the wireless charging capability of the terminal.

In another embodiment, the enquiry signaling for terminal capability does not include enquiry information enquiring about the wireless charging capability of the terminal.

After receiving the enquiry information of the terminal capability, the terminal determines that the base station enquires about information related to wireless charging capability, and can report the target capability information to the base station.

In some embodiments, in the case of determining that the terminal has wireless charging capability based on the target capability information, the base station can configure the power value for wireless charging of the terminal according to the power information of the wireless charging supported by the terminal, and/or the base station can configure the number of antennas used for wireless charging of the terminal according to the number of antennas of the wireless charging supported by the terminal, and/or, the base station can make the terminal to operate on the specified frequency resource in the case of requiring wireless charging according to the frequency information of the wireless charging supported by the terminal.

In the above embodiment, the base station can configure a more accurate wireless charging configuration for the terminal after receiving the target capability information reported by the terminal, thereby achieving high availability.

In some embodiments, referring to FIG. 12, FIG. 12 is a flowchart illustrating a wireless charging method according to an embodiment. The method may include the following steps.

In step 1201, during the process of establishing a connection with the base station, the terminal reports target capability information to the base station, where the target capability information is related to the wireless charging capability of the terminal.

In step 1202, the base station configures target configuration information for wireless charging of the terminal based on the target capability information reported by the terminal.

In step 1203, the base station wirelessly charges the terminal based on the target configuration information.

In the above embodiment, the terminal can report target capability information to the base station during the process of establishing a connection with the base station. The base station provides the terminal with more accurate wireless charging configuration, and based on the target configuration information configured by the base station for the terminal, the base station performs wireless charging for the terminal.

In some embodiments, referring to FIG. 13, FIG. 13 is a flowchart illustrating a wireless charging method according to an embodiment. The method may include the following steps.

In step 1301, after establishing a connection with the terminal, the base station sends an enquiry signaling for terminal capability to the terminal.

The enquiry signaling for the terminal capability includes enquiry information enquiring about the wireless charging capability of the terminal; alternatively, the enquiry signaling for the terminal capability does not include enquiry information enquiring about the wireless charging capability of the terminal.

In step 1302, the terminal reports target capability information to the base station based on the enquiry signaling for the terminal capability, where the target capability information is related to the wireless charging capability of the terminal.

In step 1303, the base station configures target configuration information for wireless charging of the terminal based on the target capability information reported by the terminal.

In step 1304, the base station wirelessly charges the terminal based on the target configuration information.

In the above embodiment, the terminal can report target capability information to the base station after establishing a connection with the base station. The base station provides the terminal with more accurate wireless charging configuration, and the base station performs wireless charging for the terminal based on the target configuration information configured by the base station for the terminal.

Correspondingly to the aforementioned method embodiments implemented by application functions, this disclosure also provides device embodiments implemented by application functions.

Referring to FIG. 14, FIG. 14 is a block diagram illustrating a capability reporting device according to an exemplary embodiment. The device is applied to a terminal, and includes a reporting module 1401 configured to report target capability information to the base station, where the target capability information is information related to the wireless charging capability of the terminal.

Referring to FIG. 15, FIG. 15 is an information configuration device illustrated according to an exemplary embodiment. The device is applied to a base station, and includes an information configuration module 1501 configured to configure target configuration information for wireless charging of the terminal based on the target capability information reported by the terminal. The target capability information is information related to the wireless charging capability of the terminal.

For device embodiments, since they basically correspond to method embodiments, please refer to the explanation of method embodiments for relevant information. The device embodiments described above are only schematic, where the units described as separate components may be or may not be physically separated, and the components shown as units may be or may not be physical units, and they can be located in one place or distributed across multiple network units. Some or all modules can be selected according to actual needs to achieve the purpose of the solution of the present disclosure. Those skilled in the art can understand and implement without inventive labor.

Correspondingly, the present disclosure also provides a capability reporting device, including: a processor; a memory configured to store processor executable instructions; where the processor is configured to execute any of the aforementioned capability reporting methods.

FIG. 16 is a block diagram of an electronic device 1600 illustrated according to an exemplary embodiment. For example, the electronic device 1600 can be a mobile phone, tablet, e-book reader, multimedia playback device, wearable device, vehicle terminal, iPad, smart TV, and other terminals.

Referring to FIG. 16, electronic device 1600 may include one or more of the following components: processing component 1602, memory 1604, power component 1606, multimedia component 1608, audio component 1610, input/output (I/O) interface 1612, sensor component 1616, and communication component 1618.

The processing component 1602 typically controls the overall operation of the electronic device 1600, such as operations associated with display, phone calls, data paging, camera operations, and recording operations. The processing component 1602 may include one or more processors 1620 to execute instructions to complete all or part of the steps of the aforementioned capability reporting method. In addition, the processing component 1602 may include one or more modules to facilitate the interaction between the processing component 1602 and other components. For example, the processing component 1602 may include a multimedia module to facilitate interaction between the multimedia component 1608 and the processing component 1602. For example, the processing component 1602 can read executable instructions from the memory to implement the steps of a capability reporting method provided by the above embodiments.

The memory 1604 is configured to store various types of data to support operations on the electronic device 1600. Examples of these data include instructions for any application or method run on the electronic device 1600, contact data, phone book data, messages, images, videos, etc. The memory 1604 can be implemented by any type of volatile or non-volatile storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disc.

The power component 1606 provides power to various components of the electronic device 1600. The power component 1606 can include a power management system, one or more power supplies, and other components associated with generating, managing, and distributing power for the electronic device 1600.

The multimedia component 1608 includes a display screen providing an output interface between the electronic device 1600 and the user. In some embodiments, the multimedia component 1608 includes a front camera and/or a rear camera. When the electronic device 1600 is in operating mode, such as shooting mode or video mode, the front camera and/or the rear camera can receive external multimedia data. Each of the front camera and the rear camera can be a fixed optical lens system or have focal length and optical zoom capabilities.

The audio component 1610 is configured to output and/or input audio signals. For example, the audio component 1610 includes a microphone (MIC) configured to receive external audio signals when the electronic device 1600 is in operating modes such as call mode, recording mode, and speech recognition mode. The received audio signal can be further stored in the memory 1604 or transmitted through the communication component 1618. In some embodiments, the audio component 1610 also includes a speaker for outputting audio signals.

The I/O interface 1612 provides an interface between the processing component 1602 and peripheral interface modules, which can be keyboards, click wheels, buttons, etc. These buttons can include but are not limited to: home button, volume button, start button, and lock button.

The sensor assembly 1616 includes one or more sensors for providing various aspects of state evaluation for the electronic device 1600. For example, the sensor component 1616 can detect the open/closed state of electronic device 1600, the relative positioning of the components, such as the display and the keypad of the electronic device 1600. The sensor component 1616 can also detect changes in the position of the electronic device 1600 or one component of electronic device 1600, the presence or absence of user contact with the electronic device 1600, orientation or acceleration/deceleration of the electronic device 1600 and temperature changes of the electronic device 1600. The sensor component 1616 can include a proximity sensor configured to detect the presence of nearby objects without any physical contact. The sensor component 1616 can also include optical sensors, such as CMOS or CCD image sensors, for use in imaging applications. In some embodiments, the sensor component 1616 may also include an acceleration sensor, gyroscope sensor, magnetic sensor, pressure sensor, or temperature sensor.

The communication component 1618 is configured to facilitate wired or wireless communication between the electronic device 1600 and other devices. The electronic device 1600 can access wireless network based on any communication standard, such as Wi-Fi, 2G, 3G, 4G, 5G, or 6G, or a combination of them. In an exemplary embodiment, the communication component 1618 receives broadcast signals from an external broadcast management system or broadcast related information through a broadcast channel In an exemplary embodiment, the communication component 1618 further includes a Near Field Communication (NFC) module to facilitate short range paging. For example, the NFC module can be implemented based on radio frequency identification (RFID) technology, infrared data association (IrDA) technology, ultra wideband (UWB) technology, Bluetooth (BT) technology, and other technologies.

In exemplary embodiments, the electronic device 1600 can be implemented by one or more application specific integrated circuits (ASICs), digital signal processor (DSPD), digital signal processing device (DSPD), programmable logic device (PLD), field programmable gate array (FPGA), controller, microcontroller, microprocessor, or other electronic components to perform any of the aforementioned capability reporting methods.

In exemplary embodiments, there is also provided a non-transitory machine readable storage medium including instructions, such as a memory 1604 including instructions, which can be executed by the processor 1620 of the electronic device 1600 to perform the capability reporting method described above. For example, the non-transitory computer readable storage medium can be ROM, random access memory (RAM), CD-ROM, magnetic tape, floppy disk, optical data storage device, etc.

Correspondingly, the present disclosure also provides an information configuration device, including: a processor; a memory used to store processor executable instructions; where the processor is configured to perform any of the aforementioned information configuration methods.

Figure 17:
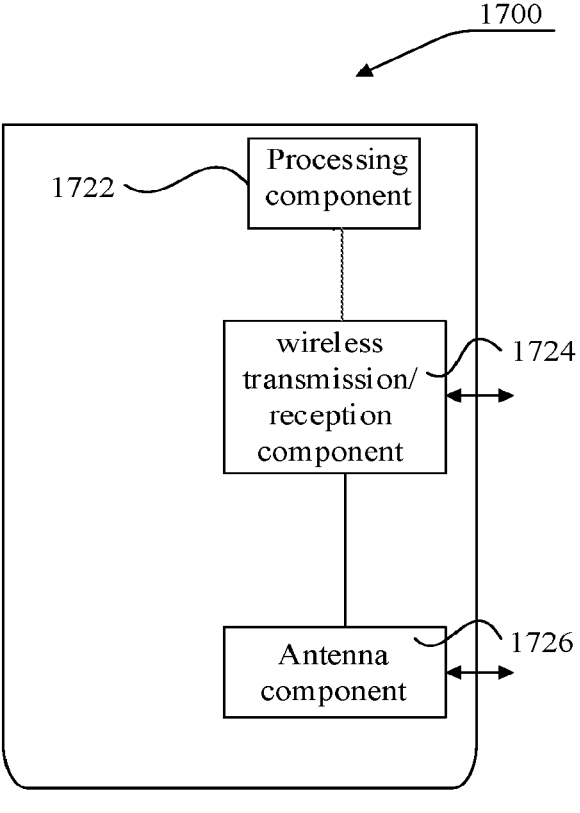
FIG. 17 is a structural schematic diagram illustrating an information configuration device according to an exemplary embodiment of the present disclosure.

As shown in FIG. 17, FIG. 17 is a structural schematic diagram of an information configuration device 1700 illustrated according to an exemplary embodiment. The device 1700 can be provided as a base station. Referring to FIG. 17, the device 1700 includes a processing component 1722, a wireless transmission/reception component 1724, an antenna component 1726, and a signal processing section unique to the wireless interface. The processing component 1722 may further include one or more processors.

One of the processors in the processing component 1722 can be configured to perform any of the information configuration methods described above.

After considering the specifications and practicing the disclosure herein, those skilled in the art will easily come up with other embodiments of the present disclosure. The disclosure intends to cover any variations, uses, or adaptive changes of this disclosure, which follow the general principles of this disclosure and include common knowledge or commonly used technical means in the technical field that are not disclosed in this disclosure. The specification and embodiments are only considered exemplary, and the true scope and spirit of this disclosure are indicated by the following claims.

It should be understood that the present disclosure is not limited to the precise structure already described above and shown in the accompanying drawings, and various modifications and changes can be made without departing from its scope. The scope of this disclosure is limited only by the accompanying claims.

What is claimed is:

1. A capability reporting method, performed by a terminal, comprising:

reporting target capability information to a base station during a process of establishing a connection with the base station, wherein the target capability information is related to wireless charging capability of the terminal, wherein reporting the target capability information to the base station during the process of establishing the connection with the base station comprises:

reporting a target message added with the target capability information to the base station, wherein the target message is sent by the terminal to the base station during a random access process, wherein the target message comprises a message 3 during the random access process, and reporting the target message added with the target capability information to the base station comprises:

reporting a first target signaling added with the target capability information to the base station, wherein the first target signaling is a signaling comprised in the message 3, wherein the first target signaling comprises at least one of the following: RRCSetupRequest signaling, RRCReestablishmentRequest signaling.

2. The method according to claim 1, wherein the target capability information comprises target indication information, and the target indication information indicates that the terminal has wireless charging capability, or the target indication information indicates that the terminal does not have wireless charging capability.

3. The method according to claim 2, wherein in a case that the target indication information indicates that the terminal has wireless charging capability, the target capability information further comprises at least one of the following: power information of wireless charging supported by the terminal, number of antennas of the wireless charging supported by the terminal, and frequency information of the wireless charging supported by the terminal.

4. The method according to claim 1, wherein reporting the target capability information to the base station during the process of establishing the connection with the base station comprises:

determining a target random access preamble corresponding to the target capability information based on corresponding relationships between random access preambles and wireless charging capability information; and sending the target random access preamble to the base station during the process of establishing the connection with the base station.

5. The method according to claim 4, further comprising any one of the following:

determining the corresponding relationships between the random access preambles and the wireless charging capability information according to a protocol; or, determining the corresponding relationships between the random access preambles and the wireless charging capability information based on a configuration of the base station.

6. The method according to claim 1, wherein the target message comprises a message 5 during the random access process, and reporting the target message added with the target capability information to the base station comprises:

reporting a second target signaling added with the target capability information to the base station, wherein the second target signaling is a signaling comprised in the message 5, wherein the second target signaling comprises at least one of the following: RRCSetupComplete signaling, RRCReestablishmentComplete signaling.

7. The method according to claim 1, wherein reporting the target capability information to the base station comprises:

reporting the target capability information to the base station after establishing a connection with the base station, wherein reporting the target capability information to the base station after establishing the connection with the base station comprises:

reporting the target capability information to the base station based on an enquiry signaling for terminal capability sent by the base station after establishing the connection with the base station.

8. The method according to claim 7, wherein the enquiry signaling for the terminal capability comprises enquiry information enquiring about the wireless charging capability of the terminal; or, the enquiry signaling for the terminal capability does not comprise enquiry information enquiring about the wireless charging capability of the terminal.

9. The method according to claim 7, wherein reporting the target capability information to the base station comprises:

reporting a terminal capability information signaling added with the target capability information to the base station.

10. An information configuration method, performed by a base station, comprising:

configuring target configuration information for wireless charging of a terminal based on target capability information reported by the terminal, wherein the target capability information is related to wireless charging capability of the terminal, receiving the target capability information reported by the terminal during a process of establishing a connection with the terminal, wherein a target message is added with the target capability information, and the target message is sent by the terminal to the base station during a random access process, wherein the target message comprises a message 3 during the random access process, and a first target signaling is added with the target capability information, and the first target signaling is a signaling comprised in the message 3, wherein the first target signaling comprises at least one of the following: RRCSetupRequest signaling, RRCReestablishmentRequest signaling.

11. The method according to claim 10, wherein the target capability information comprises target indication information, and the target indication information indicates that the terminal has wireless charging capability, or the target indication information indicates that the terminal does not have wireless charging capability.

12. The method according to claim 11, wherein when the target indication information indicates that the terminal has wireless charging capability, the target capability information further comprises at least one of the following:

power information of wireless charging supported by the terminal, number of antennas of the wireless charging supported by the terminal, and frequency information of the wireless charging supported by the terminal.

13. The method according to claim 10, further comprising:

sending an enquiry signaling for terminal capability to the terminal after establishing a connection with the terminal;

receiving the target capability information reported by the terminal based on the enquiry signaling for the terminal capability.

14. The method according to claim 13, wherein the enquiry signaling for the terminal capability comprises enquiry information enquiring about the wireless charging capability of the terminal; or the enquiry signaling for the terminal capability does not comprise enquiry information enquiring about the wireless charging capability of the terminal.

15. A base station, comprising:

a processor;

a memory for storing processor executable instructions;

wherein, the processor is configured to perform the information configuration method according to claim 10.

16. A terminal, comprising:

a processor;

a memory for storing processor-executable instructions;

wherein, the processor is configured to perform the following steps:

reporting target capability information to a base station during a process of establishing a connection with the base station, wherein the target capability information is related to wireless charging capability of the terminal, wherein reporting the target capability information to the base station during the process of establishing the connection with the base station comprises:

reporting a target message added with the target capability information to the base station, wherein the target message is sent by the terminal to the base station during a random access process, wherein the target message comprises a message 3 during the random access process, and reporting the target message added with the target capability information to the base station comprises:

reporting a first target signaling added with the target capability information to the base station, wherein the first target signaling is a signaling comprised in the message 3, wherein the first target signaling comprises at least one of the following: RRCSetupRequest signaling, RRCReestablishmentRequest signaling.

* * * * *